(12) United States Patent  (10) Patent No.: US 8,578,420 B2
Orr  (45) Date of Patent: Nov. 5, 2013

(54) METHOD AND APPARATUS FOR AUTOMATED DISPLAY OF VIDEO PROGRAMMING GUIDE INFORMATION

(75) Inventor: Stephen Orr, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 1048 days.

(21) Appl. No.: 10/839,062

(22) Filed: May 5, 2004

(65) Prior Publication Data

US 2005/0251826 A1 Nov. 10, 2005

(51) Int. Cl.
*G06F 3/00* (2006.01)
*G06F 13/00* (2006.01)
*H04N 5/445* (2011.01)

(52) U.S. Cl.
USPC .......................................................... 725/50

(58) Field of Classification Search
USPC ........................................ 725/50, 37–39, 46
See application file for complete search history.

(56) References Cited

U.S. PATENT DOCUMENTS

| 5,479,268 | A | | 12/1995 | Young et al. |
| 5,583,560 | A | | 12/1996 | Florin et al. |
| 5,809,204 | A | | 9/1998 | Young et al. |
| 5,812,124 | A | | 9/1998 | Eick et al. |
| 5,945,988 | A | * | 8/1999 | Williams et al. .............. 715/747 |
| 6,005,601 | A | | 12/1999 | Ohkura et al. |
| 6,088,722 | A | | 7/2000 | Herz et al. |
| 6,412,110 | B1 | | 6/2002 | Schein et al. |
| 6,499,029 | B1 | | 12/2002 | Kurapati et al. |
| 6,757,906 | B1 | * | 6/2004 | Look et al. ...................... 725/45 |
| 6,760,535 | B1 | | 7/2004 | Orr |
| 7,013,478 | B1 | | 3/2006 | Hendricks et al. |
| 7,131,134 | B2 | * | 10/2006 | Trovato et al. .................. 725/46 |
| 7,292,774 | B1 | * | 11/2007 | Masters et al. .................. 386/83 |
| 7,296,284 | B1 | | 11/2007 | Price et al. |
| 2002/0174433 | A1 | * | 11/2002 | Baumgartner et al. ......... 725/58 |
| 2002/0199194 | A1 | | 12/2002 | Ali |
| 2003/0046699 | A1 | * | 3/2003 | Nonomura et al. ............. 725/58 |
| 2003/0066085 | A1 | | 4/2003 | Boyer et al. |
| 2003/0084448 | A1 | | 5/2003 | Soundararajan |
| 2003/0095149 | A1 | * | 5/2003 | Fredriksson et al. ......... 345/797 |
| 2003/0110491 | A1 | | 6/2003 | Rodriguez et al. |
| 2003/0118321 | A1 | | 6/2003 | Sparrell et al. |
| 2003/0131355 | A1 | * | 7/2003 | Berenson et al. ............... 725/46 |
| 2004/0083490 | A1 | * | 4/2004 | Hane ............................... 725/46 |
| 2004/0218905 | A1 | * | 11/2004 | Green et al. ..................... 386/83 |
| 2005/0273815 | A1 | | 12/2005 | Komar et al. |
| 2005/0278742 | A1 | | 12/2005 | Komar |
| 2007/0101006 | A1 | | 5/2007 | Boyer et al. |

\* cited by examiner

*Primary Examiner* — Nasser Goodarzi
*Assistant Examiner* — An Nguyen
(74) *Attorney, Agent, or Firm* — Faegre Baker Daniels LLP

(57) ABSTRACT

A method apparatus for automated display video programming guide information includes filtering programming information using filtering rules to determine viewing events of interest to a user. The method and apparatus further includes displaying on a first screen portion, the viewing events in a chronological order based on a display time for each of the viewing events. The method and apparatus further includes displaying a selector in the first screen portion such that the selector is operative to select one of the viewing events and displaying on a second screen portion, event information relating to a selected one of the plurality viewing events when the selector is proximate to one of the viewing events. The method and apparatus further includes resolving a scheduling conflict between a first viewing event and second viewing event to generate a list of program guide information.

36 Claims, 5 Drawing Sheets

METHOD AND APPARATUS FOR AUTOMATED DISPLAY OF VIDEO PROGRAMMING GUIDE INFORMATION

FIELD OF THE INVENTION

The present invention relates generally to video programming guide information and more specifically to the filtering, orientation and display of the video programming guide information.

BACKGROUND OF THE INVENTION

Existing television viewing systems typically include a grid based electronic programming guide. A typical television broadcast includes data representing three individual data fields. The first data field is a channel lineup which defines all of the specific channels available for viewing. The second data is a show lineup which includes all of the data relating to the individual shows being displayed. The third data field is a schedule which coordinates when a particular viewing event from the show lineup is available for viewing.

In a typical electronic programming guide display system, the show lineup data represents the available viewing events, for example the specific televisions broadcast show or episode, such as an episode of the sitcom Friends or a recurring show such as the 6 o'clock Evening News. Each of the viewing events may be identified by a representative multi-digit number. Further associated with the number are index coordinates associated with a particular viewing grid. A processing device, such as a television set top box, when enabled by an end user creates a rectangular grid including time along the X axis and viewing channels along the Y axis. Based on the particular grid, the show lineup is then utilized to populate the grid by placing particular viewing events at the coordinated location within the grid. For example, for an evening news program starting on Channel 2 at 6:00, the X axis of the grid, time, for the 6:00 interval and Channel 2 on the Y axis interval would provide the coordinates for the insertion of the viewing event within the grid. Therefore, when a viewer enables the electronic program guide, the grid display of viewing information is generated, showing, among other viewing events, the evening news program available on Channel 2 at 6:00.

Further advances with electronic program guides allow for further information to be provided within the show lineup data fields. For example, a viewing event is typically labeled with a common name such that a viewer may actively recognize the name of the viewing event, for example, an episode of Friends. Further included may be information describing the plot of the episode, actor information, season and/or episode information, if the show is a new episode or a rerun, or any other information relating to providing the user with programming guide information.

Currently, more and more channels are becoming available for viewing. Therefore, more and more options are becoming available for viewing content. Furthermore, with the advent of personal video recording devices (PVRs), users have also added large amounts of recorded viewing information. Therefore, modern television viewing systems provide a veritable information overload with regard to viewable content. The information overload can be further propagated due to PVR systems recording content based on user-preferences without the user's express permission or knowledge. Based on the information overload, modern systems allow users to easily overlook viewing events. This may be especially true for seasonal content broadcast only once per year, for example, a particular sporting event.

Current programming guide information systems also allow for a user to search through available content. Searching features may be cumbersome based on ambiguities with regards to defined search characteristics. For example, different broadcasters may provide different descriptions of similar events, such as a world sports station describing a soccer event as football and a U.S. broadcast station also using the term football, but not directly referring to the sport of soccer.

The current program guide information will also allow a user to set specific channel favorites. Using an on-screen interactive menu, the user may select favorite channels, such that when the grid based display is generated, only the favorite channels are displayed on the Y axis and the corresponding program events are displayed in populating the grid relative to the time X axis.

Furthermore, another limitation with the current existing systems is the transition between show lineup information in the grid based display and subsequent viewing event information. For example, while a particular episode of a television show may be illustrated as being available on Channel 7 at 8:00, the user typically must select the particular portion of the grid and then press enter. Upon pressing enter, another window is typically generated on top of the electronic program guide subsequently blocking the program guide or a secondary window is generated which causes the program guide to be either reduced in size or further obscured. Therefore, when a user attempts to find further information about a particular viewing event, further operations must be performed which detract from the immediate visibility and/or readability of the grid-based electronic guide.

Therefore, there exists a need for an approach to the processing of program guide information and the subsequent display of the program information such that a user may quickly and automatically obtain pertinent viewing information.

DETAILED DESCRIPTION OF A PREFERRED EMBODIMENT

Figure 1:
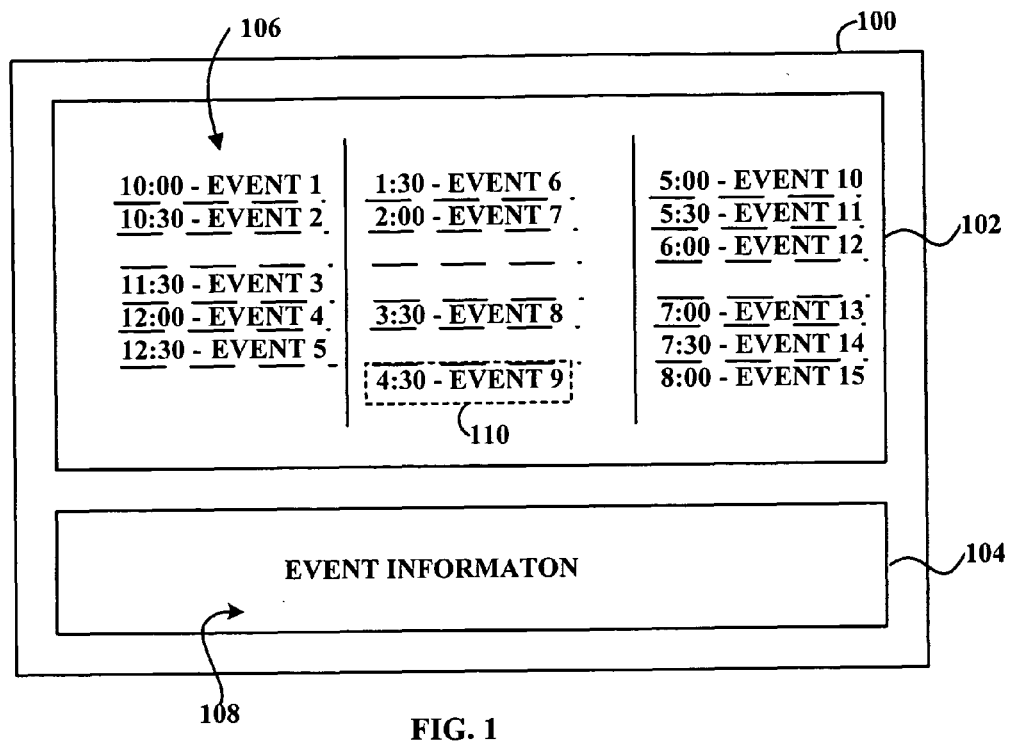
FIG. 1 illustrates a display of one embodiment of automated display video programming guide information in accordance with the one embodiment of the present invention.

Briefly, the present invention includes a method and apparatus for the automated display of video programming guide information. Video programming guide information includes data relating to viewing events or any other video programming events. The video program is typically received from a cable broadcast, recording device or any other suitable programming input source. The method and apparatus includes filtering programming information using a plurality of filtering rules to determine a plurality of viewing events. The program information includes the show lineup information typically provided in an electronic programming guide system included within a standard video broadcast transmission. The plurality of filtering rules may be any suitable criteria established either automatically by a system based on viewer preferences or established in connection with selection menus or other interactive programming to delineate particular rules to filter program information. Furthermore, the viewing events may be any suitable viewable event, such as one or more live broadcasts or recorded or time-delayed broadcast events.

The method and apparatus further includes displaying, on a first screen portion, the viewing events in a chronological order based on a display time for each of the viewing events. The first screen portion may be a portion of an overall viewing screen, and the chronological order is based on a subsequent time-based system of progressive time intervals such as half hour intervals.

The method and apparatus further includes displaying a selector in the first screen portion such that the selector is operative to select one of the viewing events. A selector may be a cursor, a highlighted portion, or any other suitable visible indicator indicating an on-screen navigation which may be controlled either through a remote controlled device or any other suitable input device.

The method and apparatus further includes displaying on a second screen portion, event information relating to a selected one of the plurality viewing events when the selector is proximate to one of the viewing events. The second screen portion may be another screen portion within the overall display, such that when the selector is either encompassing or near the viewing event listing, corresponding event information is viewable in the second display. The event information includes specific viewing information relating to the viewing event, such as, but not limited to a synopsis of the television show, information relating to actors and actresses, whether the show is new or a rerun or any other suitable information.

The method and apparatus further includes resolving a scheduling conflict between a first viewing event and a second viewing event when a display time of the first viewing event overlaps with the display time of the second viewing event. Thereupon, the method and apparatus includes comparing the viewing events determined by filtering the program information and upon compiling them in chronological order and determining if there is an overlap in time. For example, a first viewing event may begin at 9:00 a.m. and last two hours. A second viewing event may begin at 10:30 a.m., prior to the conclusion to the first viewing event. Therefore, the present invention provides for resolving the scheduling conflict between the first and second viewing events.

The present invention provides for automatic display of video programming guide information by including specific viewing events filtered from the program information using the filtering rules and displaying the viewing events in the first screen portion and concurrently displaying event information relating to selected viewing events on a second screen portion. An end user is readily provided with succinct and specific program guide information regarding what a viewer specifically wants to view thereby overcoming the information overload of current on-screen program guides with extensive channel lineups and databases of saved viewing events.

More specifically, FIG. 1 illustrates a display 100 with a first screen portion 102 and a second screen portion 104. Within the first screen portion 102 are a plurality of viewing events 106. The viewing events 106 are listed in chronological order extending from 10:00 o'clock a.m. through 8:00 o'clock p.m. It should be noted that FIG. 1 illustrates a representative embodiment of viewing events 106 representing associated programming information. For example, event 1 may indicate an episode of The People's Court, event 2 may indicate an episode of a local news program. As recognized by one have ordinary skill in the art, the identifiers 106 event 1 through event 15 represent specific names or identifiers for a particular television "program" or otherwise viewable or recordable events. The event 106 may be a historical event, meaning that it previously aired, current viewing events meaning that they are currently being aired and upcoming viewing events.

It should also be noted that the display 102 does not necessarily contain continuous chronological time intervals, but rather may further includes gaps in time when no particular viewing event 106 is to be displayed. Therefore, the exemplary embodiment of FIG. 1 could, in one embodiment, remove the space between time intervals such as the time intervals 10:30 and 11:30. Furthermore, the display 102 may include any suitable manner for illustrate the ordering of viewing events 106, especially in view of conflicting events. For example, in one embodiment the display 102 may include multiple blocks listed at a particular portion of the overlapping viewing event 106 time intervals, such as if Event 6 last an hour and Event 7 last one half hour, the column including these overlapping events may include two blocks each having a width one half column, sharing the available display area for the 2:00-2:30 time interval. In another embodiment, if a conflict arises, the higher priority event 106 may be displayed with an accompanying icon indicating the displayed event conflicts with a non-visible viewing event.

The second screen portion 104 displays event information 108. The event information 108 includes the specific information relating to the associated viewing event 106. More specifically, the dashed-box 110 on the first screen portion 102 indicates that event 9 at 4:30 has been selected. Therefore, event information 108 on the second screen portion 104 is information relating to event 9. For example, if event 9 is a half hour local news broadcast show, the event information 108 may indicate stories within the news broadcast, may contain a general description of a 4:30 news broadcast, or may contain any other suitable information to provide the user with information to make a determination for viewing the particular event.

Figure 2:
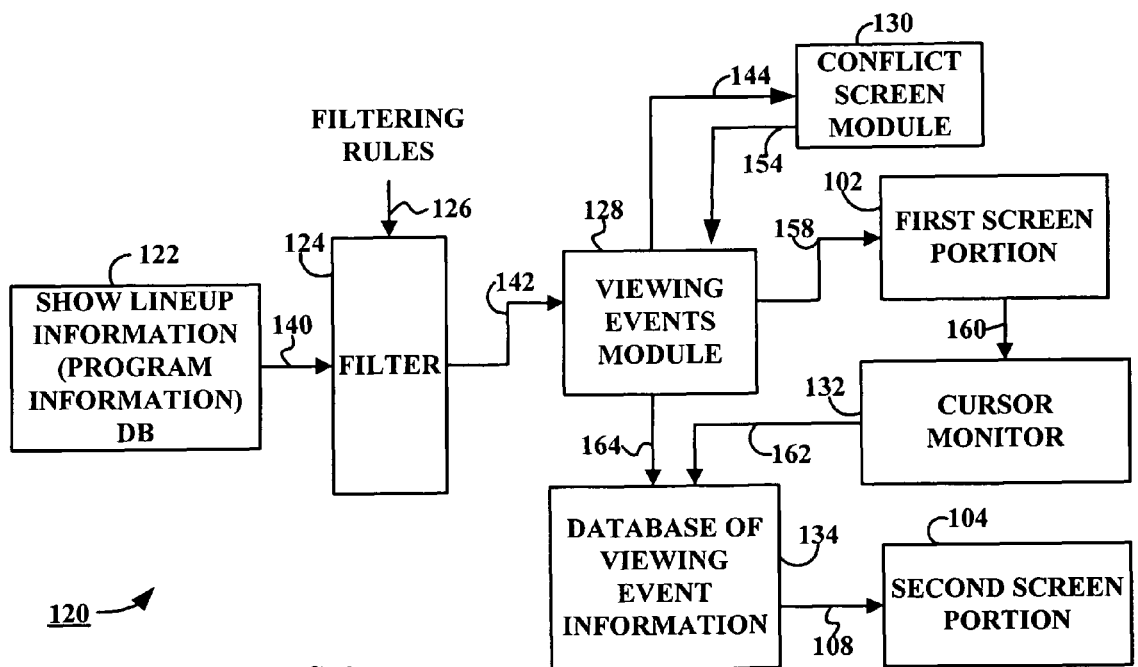
FIG. 2 illustrates a schematic block diagram of an apparatus for automated display of video programming guide information in accordance with one embodiment of the present invention.

While FIG. 1 illustrates the resultant visual display of the method and apparatus of the present invention, FIG. 2 illustrates a schematic block diagram of an apparatus 120 that allows for the generation of the associated display. The apparatus 120 includes show lineup information database 122, a filter 124 that receives filtering rules 126, viewing events module 128, a conflict screen module 130, the first screen portion 102, a cursor monitor 132, a database of viewing event information 134 and the second screen portion 104. The show lineup information database 122 contains program information retrieved from a standard electronic program guide grid-based data provider. The database 122 may also contain information from other suitable sources such as a database including event information relating to upcoming or previously viewed programming events.

The first screen portion 102 and the second screen portion 104 are illustrated as representative elements of a portion of the display 100 of FIG. 1. As recognized by one having ordinary skill in the art, the screen portions 102 and 104 may further represent frame buffer memory locations coupled to the display 100 such that viewing event information is stored therein and provideable to the display 100 within the allocated screen portions 102 and 104, as illustrated in FIG. 1.

Viewing events 140 are provided to the filter 124 in conjunction with filtering rules 126. In one embodiment, the viewing events 140 represent the show lineup information from existing electronic program guide systems. The filtering rules 126 represent various parameters for filtering the plethora of viewing events 140 in a typical electronic program guide system. The filtering rules 126 may be retrieved from a database storing the rules or may be actively solicited from the user. In one embodiment, the rules 126 are determined based on user interactivity, tracking prior user activity such as previously viewed or recorded events, other indications such as a survey or geographic preferences, and/or any other suitable information for filtering the program information 140. In one embodiment the filter 124 may further determine recommended viewing events based on the filter rules, such as recommending NYPD Blue if the filter rules list Law and Order as a viewing event, as they may be within a similar genre.

The filter 124 may be any suitable processing device capable of generating the filtered viewing events 142 from the plurality viewing events 140 filtered based on the filtering rules 126. For example, if a filtering rule 126 indicates a viewer's preference for hockey, any viewing event relating to hockey is added to the list of filtered viewing events 142.

The viewing events module 128 stores the viewing events 142 therein and provides an initial assessment of any potential conflicts. The viewing events module 128 determines the chronological time of the events 142 and cross references each of the events with the viewing duration to determine if there are any conflicts. In one embodiment, if conflicts arise, a conflict resolution request 144 is provided to a conflict screen module 130. Whereas, in another embodiment, an onscreen indicator may be displayed to highlight the conflict.

Figure 3:
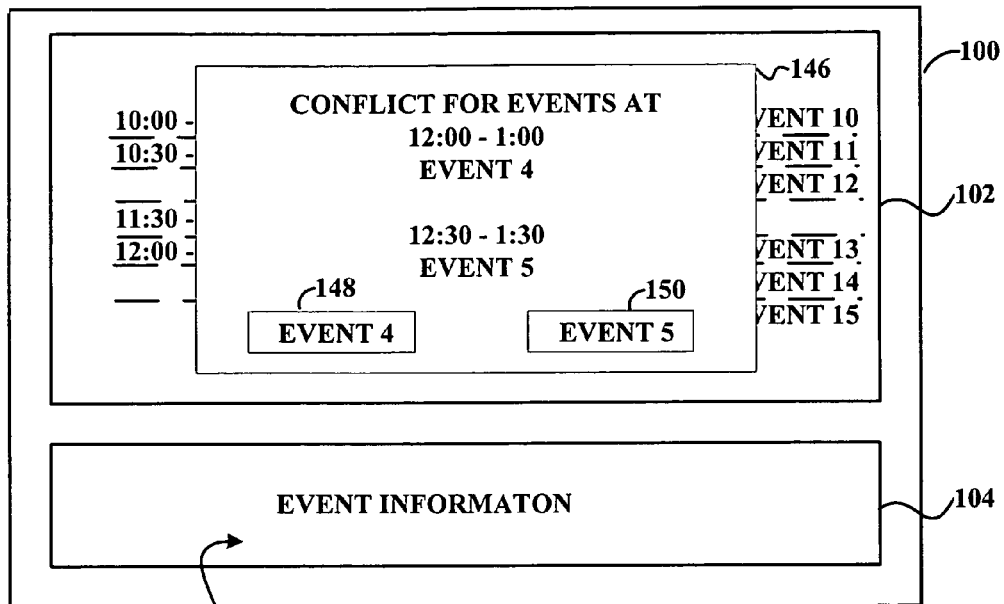
FIG. 3 illustrates another graphical display of video programming guide information including a conflict resolution screen, in accordance with one embodiment of the present invention.

In one embodiment, when a conflict arises, user-interactivity may be utilized to resolve the conflict. The conflict screen module 130 generates a stand alone window which requires user interactivity to determine a preference to resolve the potential conflicts. FIG. 3 illustrates a graphical representation of the display 100 of the first screen portion 102 and the second screen portion 104 with event information 108 therein. A conflict resolution screen 146 is also visible showing a conflict between event number 4 which begins at 12:00 and goes to 1:00 and events which begins at 12:30 and goes until 1:30.

In one embodiment of the conflict resolution screen 146, a user selects a particular event to resolve the conflict. An event 4 box 148 and an event 5 box 150 will provide such that the user may, through any available input device such as a remote control, keyboard, mouse or any other input device, select one of the two events. In another embodiment, conflict resolution may be achieved based on priority rules or other criteria to resolve the conflict. For example, specific viewing events may be given a particular priority setting, therefore one resolution may be comparing priority settings and listing the viewing event having a higher priority setting. For example, if a system notes a user's preference for Hockey and a particular sitcom television show and these shows overlap, the system may determine if the Hockey game is a subscription-based broadcast that user subscribes to, if the game is subject to a local blackout, if the television show is a rerun and has been previously viewed, or any other criteria for determine which viewing event to grant priority.

Referring back to FIG. 2, the conflict screen module 130 provides a conflict resolution signal 154 to the viewing events module 128. The resolution signal 154 may include priority levels for the viewing events such that higher priority events are viewed and lower priority events may be skipped or recorded. Thereupon, the viewing event module 128 generate a display signal 158 to the first screen portion 102. In one embodiment, the display signal 158 includes the viewing events in a chronological order based on a display time for each of the viewing events. In one embodiment, each of the plurality of viewing events is also an active link or provides for direct interactivity with regards to viewing information associated with the viewing event. Therefore, the first screen portioned 102 provides a first screen display signal 160 to the cursor monitor 132 monitoring the location of a user activated cursor. Based on the location of the cursor and upon the depressing of an enter button, the cursor monitor may then send a selection signal 162 to the database of viewing event information 134.

The database of viewing event information 134 also receives the corresponding list of viewing events 164 from the viewing event module 128. Therefore, the database of viewing event information 134 contains the corresponding viewing event information for each of the displayed viewing events on the first screen portion 102 and all other viewing events which may not be displayed on the first screen portion due to screen size or scheduling conflict resolutions.

Upon receipt of the enablement signal 162, the database of viewing event information 134 provides the event information 108 to the second screen portion 104. Therefore, the apparatus 120 of FIG. 2 provides for the automatic display of video programming guide information including a chronological order of non-scheduling conflicted events and event information 108 regarding a selected viewing event.

As recognized by one having ordinary skill in the art, the apparatus 120 further provides for continued interactivity for program guide information. For example, if a user continues to move a cursor, the cursor monitor 132 tracks the location of the cursor. When a different viewing event is selected, new viewing event information 108 is displayed on the second screen portion 104 to provide further continued interactivity with electronic program guide information.

The elements of the apparatus 120 may provide for data processing operations in response to executable instructions. The elements may be disposed within one or more processors or may represent executable operations performed by one or more processors. The elements may be implemented in hardware, software or any other suitable implementation recognized by one having ordinary skill in the art. Interactivity between elements may be within a single processing environment, such as a stand alone computing device or may be across one or more processing environments such as across multiple computing devices networked, wired or wirelessly, across a wide area network, local area network, internet, intranet or any other suitable network. Any processor may be, but not limited to, a single processor, a plurality of processors, a DSP, a microprocessor, ASIC, state machine, or any other implementation capable of processing and executing software or discrete logic or any suitable combination of hardware, software and/or firmware. The term processor should not be construed to refer exclusively to hardware capable of executing software, and may implicitly include DSP hardware, ROM for storing software, RAM, and any other volatile or non-volatile storage medium. Moreover, the databases of the apparatus 120 may be, but not limited to, a single memory, a plurality of memory locations, shared memory, CD, DVD, ROM, RAM, EEPROM, optical storage, microcode, or any other non-volatile storage medium capable of storing digital data.

Figure 4:
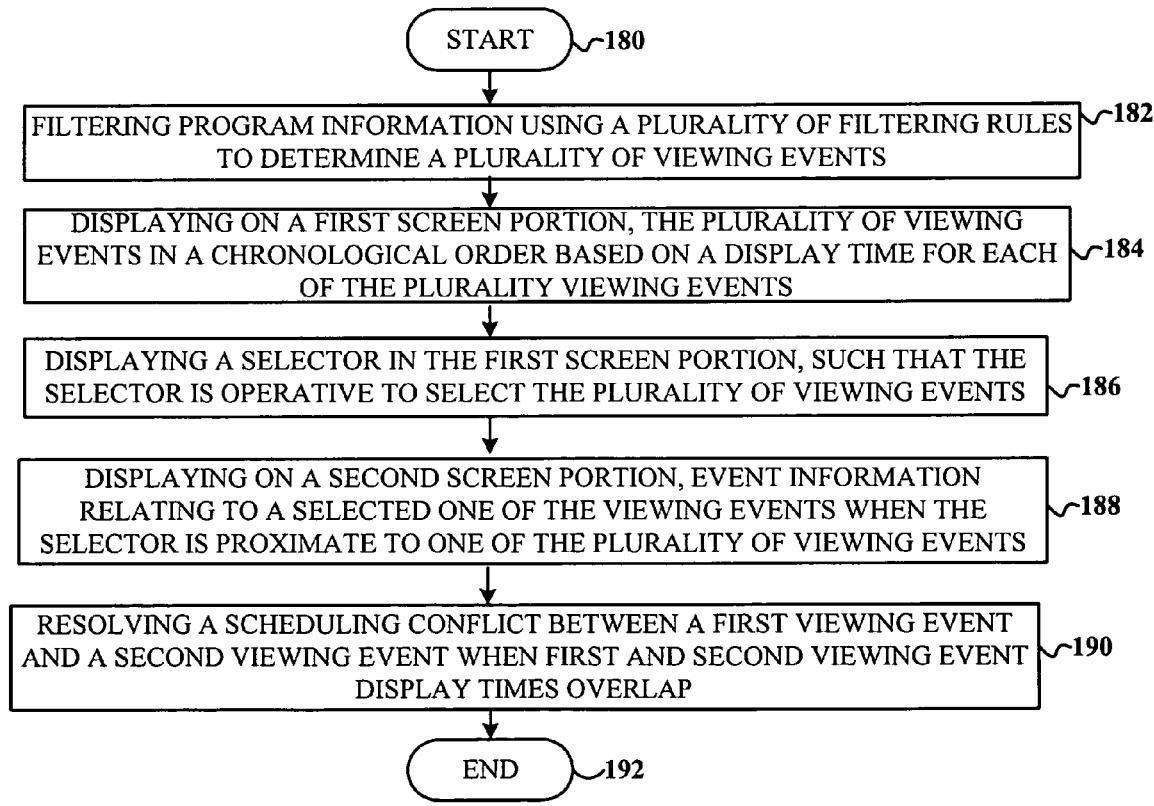
FIG. 4 illustrates a flow chart of a method for automated display of video programming guide information in accordance with one embodiment of the present invention.

FIG. 4 illustrates one embodiment of a method for automated display of video programming guide information. The method begins, 180, by filtering program information using a plurality of filtering rules to determine the plurality of viewing events, step 182. As discussed above with regard to FIG. 2, the program information may be obtained from any suitable source, such as show lineup information from a typical electronic program guide system. The filtering rules may be retrieved from a database or stored within a processing element wherein the filtering rules are determined in response to user input or any other suitable determination of rules for filtering the program information and thereupon determine specific viewing events in response to user defined parameters.

Step 184 is displaying on a first screen portion the plurality of viewing events in a chronological order based on the display time for each of the plurality of viewing events. For example, in the exemplary embodiment of a display 100 of FIG. 1, the first screen portion 102 includes the plurality of viewing events 106 in a chronological order based on the display time. Step 186 is displaying a selector in the first screen portion such that the selector is operative to select one of the plurality of viewing events. Once again with respect to FIG. 1, a selector 110 is illustrated on selecting event 9 at display time 4:30. Upon selection, step 188 is displaying on a second screen portion, event information relating to a selected one of the plurality of viewing events when the selector is proximate to one of the plurality of viewing events. Once again with respect to FIG. 1, the event information 108 is shown on the second screen portion 104 of the display 100.

Step 190 is resolving a scheduling conflict between a first viewing event and a second viewing event when a display time of the first viewing event overlaps with the display time of the second viewing event. As shown in the exemplary embodiment of FIG. 3, a conflict resolution screen 146 is provided to seek a resolution of conflicting events 4 and 5, such that a user may provide a direct input to resolve the scheduling conflict. Thereupon, one embodiment of the method for automated display of video programming information of the present invention is complete, step 192.

Figure 5:
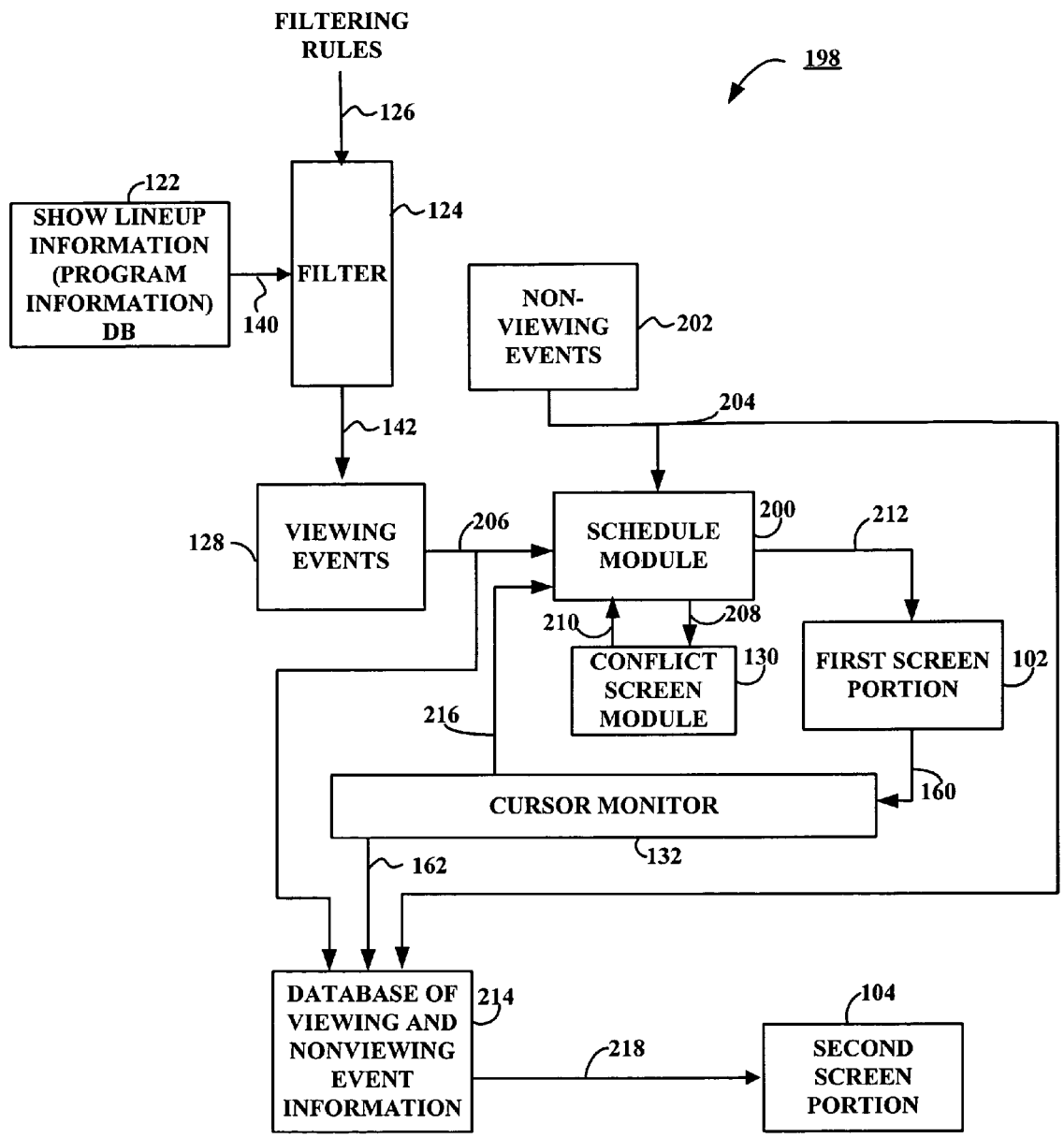
FIG. 5 illustrates a schematic block diagram of an apparatus for automated display of video programming guide information in accordance with one embodiment of the present invention.

FIG. 5 illustrates another embodiment of the present invention including the addition on further schedule information beyond viewing events. The apparatus 198 is similar to the apparatus 120 of FIG. 2, but further includes a non-viewing events database 202 providing a list of non-viewing events 204 to a scheduling module 200. The scheduling module 200 allows for the generation of a master events schedule list including viewing events 158 and the non-viewing events 204. The non-viewing events 204 may be any suitable events or scheduling elements, such as found within a calendar, to-do list, docket or any other suitable schedule. For example, a typical non-viewing event may be a weekly soccer practice, a birthday party, a parent-teacher conference or any other suitable event. The non-viewing events database 202 may be any suitable source, such as, but not limited to, a calendar program within a home computer, a personal digital assistant, or a stand-alone calendar software application in communication with the scheduling module 200.

More specifically, similar to the apparatus 120, the show lineup information database 122 provides a list of viewing events 140 to the filter 124. Using the filtering rules 126, filtered viewing events 142 is provided to the viewing events module 128. The viewing events module 128 thereupon assembles the viewing events into a chronologically based list. In one embodiment, the viewing events module 128 may provide for viewing event conflict resolution, similar to the conflict screen module 130 of FIG. 2. Although, in another embodiment, viewing events conflicts may be noted, but not resolved as further conflicts may arise with respect to the non-viewing events 204.

Therefore, in the embodiment of FIG. 5, the schedule module 200 receives a chronological list of viewing events 206 and the list of non-viewing events 204. The scheduling module may then compile a list of events, including viewing events 206 and non-viewing events 204. The scheduling module 200 is thereupon coupled to the conflict screen module 130 in the event a conflict exists between various events. The scheduling module 200 provides a conflict signal 208 to the conflict screen module 130, wherein the conflict signal 208 includes, among other things, the conflicting events and an indication of the events as being viewing events or non-viewing events.

Similar to the conflict resolution described above, the viewer may select a particular viewing event among several conflicted viewing events. In other embodiments, when a viewing event conflicts with a non-viewing event, the user may be given the selection of recording the viewing event and in another embodiment, the conflict screen module 130 may provide an automatic indication that the conflicted viewing event is to be recorded based on the conflict with the non-viewing event. Once a resolution to the conflicts is achieved, a resolution signal 210 indicates the appropriate preferences for assembling a chronological viewing event list 212. As noted in FIG. 1, conflicts may also be displayed with conflict resolution occurring later in time, such the display of conflict events and the user determining if to activate a user-selected conflict resolution approach or possibly utilizing preset priority criteria for resolve conflicts later in time.

The chronological viewing event list 212 is generated by the scheduling module 200 and provided to the first screen portion 102. The viewing event information 206 and the non-viewing event information 204 are also provided to a database 214. Similar to the apparatus 120 of FIG. 2, the listed events on the first display 102 are active links such that the first screen display signal 160 is provided to the cursor monitor 132 monitoring the location of a user activated cursor. Based on the location of the cursor and upon the depressing of an enter button, the cursor monitor may then send a selection signal 162 to the database 214.

In response thereto, the database 214 provides corresponding event information 218 to the second screen portion. In one embodiment, if the event information 218 is a non-viewing event, the information 218 may include a description of time and place of event, for example, Soccer Practice at Field A from 4:30-6:00. If the information 218 is viewing event information, the information 218 may include any suitable information as described above with respect to FIGS. 1-3.

The cursor monitor 132 may further provide for other levels of user interactivity through continued tracking of the first screen display signal 160 and providing feedback 216 with the schedule module 200. For example, a user may scroll into future time periods beyond the active display, therefore the schedule module 200 may receive an indicator 216 to advance the display of events, such as advance by a single 24 hour interval or to a next page of chronologically ordered events.

In another embodiment of the present invention, a database of non-scheduled viewing events may be utilized, wherein the database of non-scheduled viewing events may include previously recorded events. For example, a PVR may provide a listing of recorded events with record times and associated event information. In one embodiment, the schedule module 200 may include the insertion of non-scheduled viewing events in time intervals left open by the absence of viewing events and non-viewing events. Whereas, in another embodiment, the schedule module 200 may prioritize non-scheduled viewing events with either viewing events and/or non-viewing events and offer the option to record viewing events while watching non-scheduled viewing events. Regardless thereof, this embodiment maximizes scheduling opportunities through the insertion of previously recorded content within free schedule time intervals.

Figure 6:
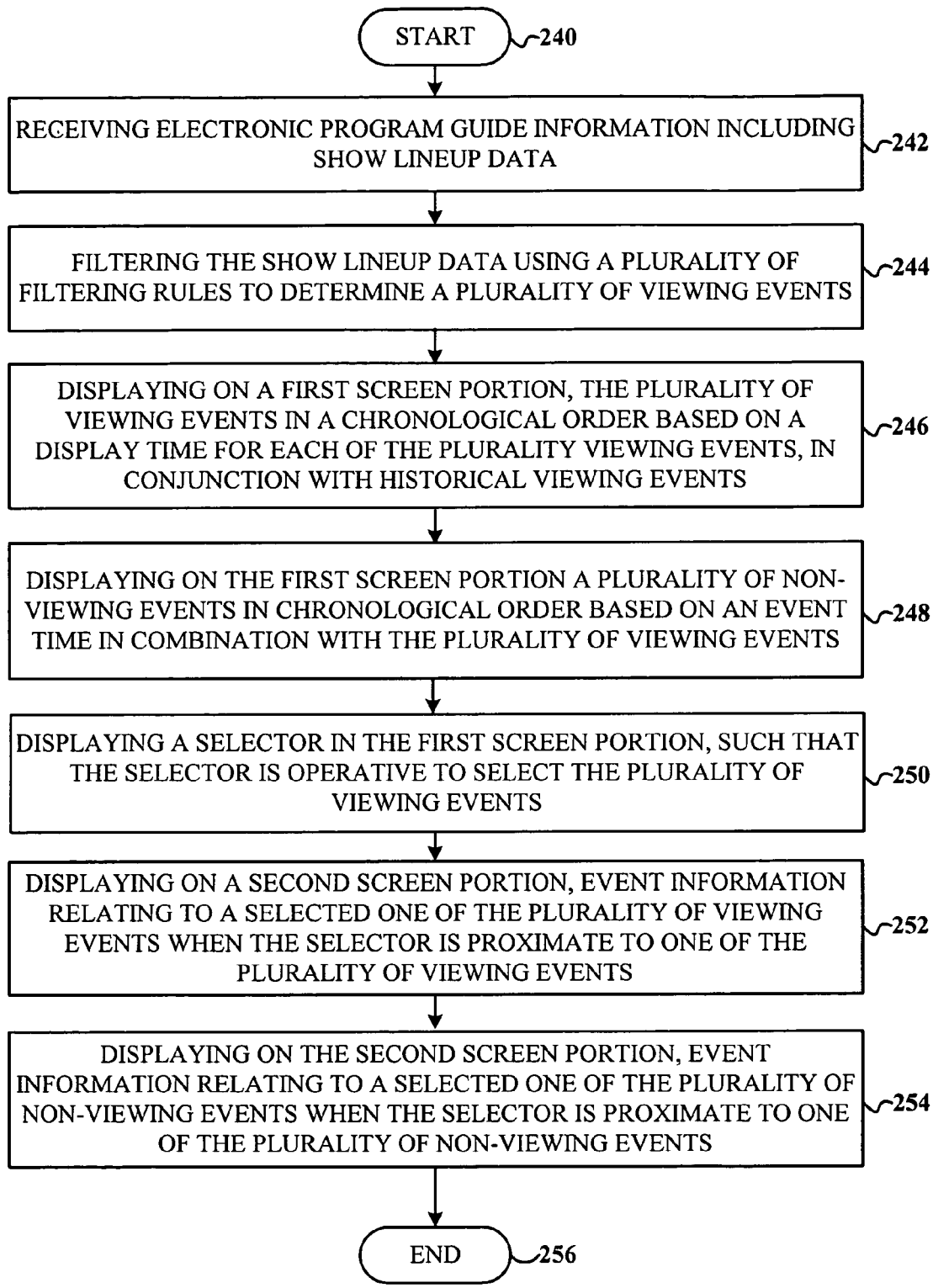
FIG. 6 illustrates a flow chart of a method for automated display of video programming guide information in accordance with one embodiment of the present invention.

FIG. 6 illustrates another embodiment of a method for automated display of video programming guide information. The method begins, step 240, by receiving electronic program guide information including show lineup data, step 242. As noted above, this information may be retrieved from a standard electronic program guide grid-based provider. Step 244 is filtering the show lineup data using a plurality of filtering rules to determine a plurality of viewing events. The filter rules may be determined based on any suitable techniques, including querying the user, tracking existing viewing habits, geographic preferences, or any other suitable techniques as recognized by one having ordinary skill in the art.

Step 246 is displaying on a first screen portion, the plurality of viewing events in a chronological order based on a display time for each of the plurality viewing events, in conjunction with historical viewing events. In one embodiment, historical viewing events may include events previously viewed as well as events previously scheduled but missed and events scheduled and recorded. The historical viewing events may be listed in any suitable format but may be listed in a non-chronological format.

Step 248 is displaying on the first screen portion a plurality of non-viewing events in chronological order based on an event time in combination with the plurality of viewing events. As noted above, the non-viewing events may be integrated with the viewing events, whereas in another embodiment, separate chronological listings of viewing and non-viewing events may be provided. Step 250 is displaying a selector in the first screen portion, such that the selector is operative to select one of the plurality of viewing or non-viewing events. The selector may be any suitable type of cursor or other indicator of on-screen interactivity.

Step 252 is displaying on a second screen portion, event information relating to a selected one of the plurality of viewing events when the selector is proximate to one of the plurality of viewing events. Step 254 is displaying on the second screen portion, event information relating to a selected one of the plurality of non-viewing events when the selector is proximate to one of the plurality of non-viewing events. In one embodiment, based on the selection of a cursor location or other interactivity, the second screen portion displays the appropriate event information relating to either the viewing event or the non-viewing event. Thereupon, the method of one embodiment of the present invention is complete, step 256.

Figure 7:
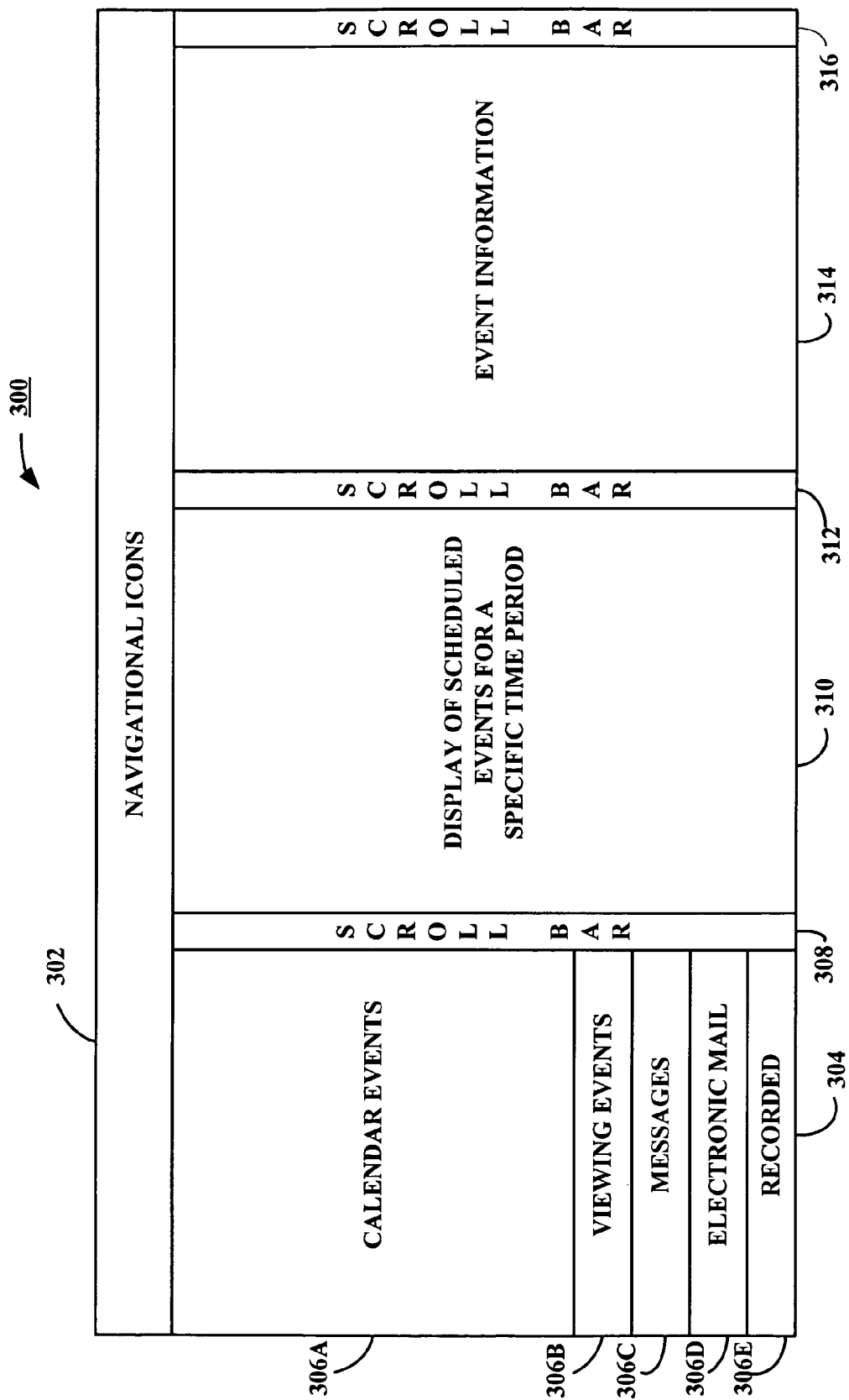
FIG. 7 illustrates a graphical representation of an automated display of video programming guide information in accordance with one embodiment of the present invention.

FIG. 7 illustrates one embodiment of a display 300, which may be any suitable display such as but not limited to a television display, a computer monitor display, or a personal digital assistant display. The display 300 includes four separate portions. A first portion 302 is a top bar containing navigational icons. Based on different applications, suitable icons may be displayed, such as a forward in time icon, a change display type icon, display preferences icon, filtering rule activation menu icon, create new event entries icon, delete event icon, access to email icon or any other suitable icons as recognized by one having ordinary skill in the art.

A second portion 304 includes category-based windows 306*a*-306*e*. In one embodiment, the windows 306 may be expanded and contracted based on user interactivity. For example, if a user selects the viewing events window 306*b*, the calendar events window 306*a* may be minimized and the viewing events window 306*b* maximized into the available space. Furthermore, in one embodiment, the second portion 304 may include a scroll bar 308, allowing a user to scroll vertically within the portion 304.

In one embodiment of the present invention, window 306*e*, entitled recorded may provide a window of recorded events. When the recorded window 306*e* is expanded, an active link to a recorded viewing event menu may be provided and one of the recorded viewing event menus provides a display of recorded viewing events. In another embodiment, the recorded viewing events may be integrated within a schedule of viewing and non-viewing events. Moreover, the window 306*e* may include a list of viewing events to be recorded, including a recording time for each of the viewing events such that a user may actively know pre-designated recording events for conflict resolution purposes.

A third portion 310 includes a display window for the display of scheduled events for a specific time period. The third portion 310 may be similar to the first screen portion 102 of FIGS. 1-4 including the display of viewing events and non-viewing events. In one embodiment, the events displayed in portion 310 may directly correspond to the active window 306 in the second portion 304. For example, if the viewing events window 306B is activated, the display within portion 310 may be the scheduled viewing events and if the calendar events window 306A is activated, the display within portion 310 may be the scheduled non-viewing events. In another embodiment, the display within the portion 310 may be all scheduled viewing and non-viewing events independent of the selected window 306 of the second portion 304.

In one embodiment, the third portion 310 may include a scroll bar 312, allowing a user to scroll vertically within the portion 310. In the event the display information is a chronological listing of viewing and non-viewing events, the scroll bar 312 allows a user to actively scroll forward in time and back in time.

A fourth portion 314 includes a display window for the display of event information associated with a selected event from the third portion 310. The fourth portion 314 may be similar to the second screen portion 104 of FIGS. 1-4 including the display of viewing event information and non-viewing event information. In one embodiment, the fourth portion 314 may include a scroll bar 316, allowing a user to scroll vertically within the portion 314, in the event the event information requires more than a full screen available by the fourth portion 314.

As such, the present invention provides for improved automated display of video programming guide information through the filtering, conflicting resolution and assembly of viewing and non-viewing events. In the prior electronic program guide systems, user were overloaded with information. The present invention reduces the amount of information a user must review in making a viewing choice by the initial filtering operations. The present invention further reduces viewer information overload by seeking resolution of scheduling conflicts of filtered events. Thereupon, the present invention generates a chronological list of preferred viewing events, in conjunction with non-viewing events, for providing a day-planner type listing of events, converging television based viewing events and normal everyday life user non-viewing events in an interactive user format that provides for quick access to not only the events, but also corresponding information associated with the events.

It should be understood that the implementation of other variations and modifications of the invention in its various aspects will be apparent to those of ordinary skill in the art, and that the invention is not limited by the specific embodiments described herein. For example, viewing events and non-viewing events may be listed and/or categorized based on specific preferences for different users such that the first screen portion 102 may actively list viewing and non-viewing events for different users, such as different family members. It is therefore contemplated to cover by the present invention, any and all modifications, variations or equivalents that fallen within the spirit and scope of the basic underlying principles disclosed and claimed herein.

What is claimed is:

1. A method for automated display of video programming guide information, the method comprising:
   filtering program information using a plurality of filtering rules to determine a plurality of viewing events;
   identifying a scheduling conflict between a first viewing event and a second viewing event of the plurality of viewing events when a display time of the first viewing event overlaps with a display time of the second viewing event;
   displaying, on a first screen portion, the plurality of viewing events in a chronological order based on a display time for each of the plurality of viewing events, wherein displaying the plurality of viewing events in the chronological order comprises resolving the scheduling conflict identified between the first viewing event and the second viewing event of the plurality of viewing events and displaying in the first screen portion only those viewing events that are non-scheduling conflicted events based on the scheduling conflict resolution, arranged in a chronological order based on display time for each of the non-scheduling conflicted events, wherein the non-scheduling conflicted events displayed in the first screen portion are whole viewing events;
   displaying a selector in the first screen portion, such that the selector is operative to select at least one of the plurality of viewing events; and
   displaying, on a second screen portion, event information relating to a selected one of the plurality of viewing events when the selector is proximate to one of the plurality of viewing events.

2. The method of claim 1 wherein resolving the scheduling conflict includes:
   querying a user regarding the conflict;
   receiving a user preference indication; and
   prioritizing the first viewing event and the second event in response to the user preference indication.

3. The method of claim 1 wherein resolving the scheduling conflict includes:
   applying at least one priority rule to the first viewing event and the second viewing event; and
   prioritizing the first viewing event and the second viewing event in response to the priority rules.

4. The method of claim 1 wherein the displaying of viewing events includes:
   displaying historical viewing events, current viewing events and upcoming viewing events.

5. The method of claim 1 further comprising:
   displaying an active link in a third screen portion to a recorded viewing event menu, wherein the recorded viewing event menu provides a display of recorded viewing events.

6. The method of claim 5 wherein the recorded viewing event menu further includes viewing events to be recorded, including a recording time for each of the viewing events to be recorded.

7. The method of claim 1 further comprising:
   displaying, on the first screen portion, a plurality of non-viewing events in chronological order in conjunction with viewing events.

8. The method of claim 7 wherein the non-viewing events are retrieved from a calendar database, the method further comprising:
   displaying, on the second screen portion, event information relating to a selected one of the plurality of non-viewing events when the selector is proximate to one of the plurality of non-viewing events.

9. The method of claim 1 wherein the filtering rules further provide to determine a plurality of recommended viewing events based on the plurality of viewing events.

10. The method of claim 1 further comprising automatically determining the plurality of filtering rules in response to previously viewed or recorded events.

11. The method of claim 1 comprising generating a resolution signal that comprises priority levels for viewing events such that higher priority events are viewed and lower priority events are recorded.

12. The method of claim 1, further including displaying, on the first screen portion, recorded viewing events with the viewing events such that the recorded viewing events are displayed in time intervals lacking viewing events.

13. The method of claim 1, wherein identifying the scheduling conflict comprises determining a display time of each of the plurality of viewing events and cross referencing the display times of the plurality of viewing events to identify the scheduling conflict.

14. An apparatus for automated display of video programming guide information, the apparatus comprising:
   a memory device operative to store executable instructions; and
   a processing device operably coupled to the memory operative to receive the executable instructions, such that the processor, in response to the executable instructions:
   filters program information using a plurality of filtering rules to determine a plurality of viewing events;
   identifies a scheduling conflict between a first viewing event and a second viewing event of the plurality of viewing events when a display time of the first viewing event overlaps with a display time of the second viewing event;
   displays, on a first screen portion, the plurality of viewing events in a chronological order based on a display time for each of the plurality viewing events, wherein displaying the plurality of viewing events in the chronological order comprises resolving the scheduling conflict identified between the first viewing event and the second viewing event of the plurality of viewing events and displaying in the first screen portion only those viewing events that are non-scheduling conflicted events based on the scheduling conflict resolution, arranged in a chronological order based on display time for each of the non-scheduling conflicted events, wherein the non-scheduling conflicted events displayed in the first screen portion are whole viewing events;

displays a selector in the first screen portion, such that the selector is operative to select the plurality of viewing events; and displays, on a second screen portion, event information relating to a selected one of the plurality of viewing events when the selector is proximate to one of the plurality of viewing events.

15. The apparatus of claim 14 wherein the processor, in resolving the scheduling conflict includes, in response to the executable instructions:

queries a user regarding the conflict;
receives a user preference indication; and
prioritizing the first viewing event and the second viewing event in response to the user preference indication.

16. The apparatus of claim 14 wherein resolving the scheduling conflict includes:

applying at least one priority rule to the first viewing event and the second viewing event; and
prioritizing the first viewing event and the second viewing event in response to the priority rules.

17. The apparatus of claim 14 wherein the processor, in displaying of the viewing events includes, in response to the executable instructions:

displays historical viewing events, current viewing events and upcoming viewing events.

18. The apparatus of claim 14, wherein the processor, further in response to the executable instructions:

displays an active link to a recorded viewing event menu, wherein the recorded viewing event menu provides a display of recorded viewing events, wherein the recorded viewing event menu further includes viewing events to be recorded, including a recording time for each of the viewing events to be recorded.

19. The apparatus of claim 14, wherein the processor, further in response to the executable instructions:

displays, on the first screen portion, a plurality of non-viewing events in chronological order in conjunction with viewing events.

20. The apparatus of claim 19 further comprising:

a calendar database operatively coupled to the processor, wherein the non-viewing events are retrieved from the calendar database, the processor further in response to executable instructions:
displays, on the second screen portion, event information relating to a selected one of the plurality of non-viewing events when the selector is proximate to one of the plurality of non-viewing events.

21. The apparatus of claim 14 wherein processor further in response to the executable instructions:

determines a plurality of recommended viewing events based on the plurality of viewing events.

22. The apparatus of claim 14, wherein the processor further, in response to the executable instructions, automatically determines the plurality of filtering rules in response to previously viewed or recorded events.

23. The apparatus of claim 14, wherein the processor further, in response to the executable instructions, displays, on the first screen portion, recorded viewing events with the viewing events such that the recorded viewing events are displayed in time intervals lacking viewing events.

24. The apparatus of claim 14, wherein the processor identifies the scheduling conflict by determining a display time of each of the plurality of viewing events and cross referencing the display time of each of the plurality of viewing events to identify the scheduling conflict.

25. A method for automated display of video programming guide information, the method comprising:

receiving electronic program guide information including show lineup data;
filtering the show lineup data using a plurality of filtering rules to determine a plurality of viewing events;
identifying a scheduling conflict between a first viewing event and a second viewing event of the plurality of viewing events when a display time of the first viewing event overlaps with a display time of the second viewing event;
displaying, on a first screen portion, the plurality of viewing events in a chronological order based on a display time for each of the plurality viewing events, in conjunction with historical viewing events, wherein displaying the plurality of viewing events in the chronological order comprises resolving the scheduling conflict identified between the first viewing event and the second viewing event of the plurality of viewing events and displaying in the first screen portion only those viewing events that are non-scheduling conflicted events based on the scheduling conflict resolution, arranged in a chronological order based on display time for each of the non-scheduling conflicted events, wherein the non-scheduling conflicted events displayed in the first screen portion are whole viewing events;
displaying, on the first screen portion, a plurality of non-viewing events in chronological order based on an event time in combination with the plurality of viewing events;
displaying a selector in the first screen portion, such that the selector is operative to select at least one of the plurality of viewing events;
displaying, on a second screen portion, event information relating to a selected one of the plurality of viewing events when the selector is proximate to one of the plurality of viewing events; and
displaying, on the second screen portion, event information relating to a selected one of the plurality of non-viewing events when the selector is proximate to one of the plurality of non-viewing events.

26. The method of claim 25 wherein:

resolving a scheduling conflict between a first viewing event and a second viewing event when a display time of the first viewing event overlaps with a display time of the second viewing event includes:
querying a user regarding the conflict;
receiving a user preference indication; and
prioritizing the first viewing event and the second viewing event in response to the user preference indication.

27. The method of claim 26 wherein non-scheduled viewing events are displayed with the viewing events and non-viewing events such that the non-scheduled viewing events are displayed at time intervals absent viewing events and non-viewing events.

28. The method of claim 25 wherein resolving a scheduling conflict between a first viewing event and a second viewing event when a display time of the first viewing event overlaps with a display time of the second viewing event includes:

applying at least one priority rule to the first viewing event and the second viewing event; and
prioritizing the first viewing event and the second viewing event in response to the priority rules.

29. The method of claim 25 further comprising:
displaying an active link to a recorded viewing event menu, wherein the recorded viewing event menu provides a display of recorded viewing events, wherein the recorded viewing event menu further includes viewing events to be recorded, including a recording time for each of the viewing events to be recorded.

30. The method of claim 25 further comprising automatically determining the plurality of filtering rules in response to previously viewed or recorded events.

31. A method for automated display of video programming guide information, the method comprising:
filtering program information, by at least one programmed processor, using a plurality of filtering rules to determine a plurality of viewing events;
identifying, by the at least one programmed processor, a scheduling conflict between a first viewing event and a second viewing event of the plurality of viewing events when a display time of the first viewing event overlaps with a display time of the second viewing event; and
displaying the plurality of viewing events in a chronological order based on a display time for each of the plurality of viewing events, wherein displaying the plurality of viewing events in the chronological order comprises resolving the scheduling conflict identified between the first viewing event and the second viewing event of the plurality of viewing events and displaying those viewing events that are non-scheduling conflicted events based on the scheduling conflict resolution, arranged in a chronological order based on display time for each of the non-scheduling conflicted events, wherein the non-scheduling conflicted events are whole viewing events.

32. The method of claim 31, further including displaying recorded viewing events with the viewing events such that the recorded viewing events are displayed in time intervals lacking viewing events.

33. The method of claim 31, wherein identifying the scheduling conflict comprises determining a display time of each of the plurality of viewing events and cross referencing the display times of the plurality of viewing events to identify the scheduling conflict.

34. A method for automated display of video programming guide information, the method comprising:
filtering program information, by at least one programmed processor, using a plurality of filtering rules to determine a plurality of viewing events; and
determining a scheduling conflict between a first viewing event and a second viewing event of the plurality of viewing events when a display time of the first viewing event overlaps with a display time of the second viewing event and generating notification information based on the scheduling conflict and displaying those viewing events that are non-scheduling conflicted events based on a resolution of the scheduling conflict, arranged in a chronological order based on display time for each of the non-scheduling conflicted events, wherein the non-scheduling conflicted events are whole viewing events.

35. The method of claim 34 further comprising receiving user input to resolve the scheduling conflict and resolving the scheduling conflict.

36. The method of claim 34, wherein determining the scheduling conflict comprises determining a display time of each of the plurality of viewing events and cross referencing the display times of the plurality of viewing events to determine the scheduling conflict.

\* \* \* \* \*